US012671962B2

(12) United States Patent
Sanchez

(10) Patent No.: US 12,671,962 B2
(45) Date of Patent: \*Jun. 30, 2026

(54) SYSTEMS AND METHODS FOR DETERMINING MOBILE DEVICE STATUS

(71) Applicant: QUANATA, LLC, San Francisco, CA (US)

(72) Inventor: Kenneth Jason Sanchez, San Francisco, CA (US)

(73) Assignee: QUANATA, LLC, San Francisco, CA (US)

( \* ) Notice: Subject to any disclaimer, the term of this patent is extended or adjusted under 35 U.S.C. 154(b) by 272 days.

This patent is subject to a terminal disclaimer.

(21) Appl. No.: 18/210,299

(22) Filed: Jun. 15, 2023

(65) Prior Publication Data

US 2023/0328482 A1 Oct. 12, 2023

Related U.S. Application Data

(63) Continuation of application No. 17/742,453, filed on May 12, 2022, now Pat. No. 11,711,671, which is a
(Continued)

(51) Int. Cl.
*H04W 4/029* (2018.01)
*H04W 4/20* (2018.01)

(52) U.S. Cl.
CPC ............. *H04W 4/029* (2018.02); *H04W 4/20* (2013.01)

(58) Field of Classification Search
CPC .... H04W 4/029; H04W 4/20; G06Q 10/0635; G06Q 10/0639; G06Q 30/02; G06Q 40/08; G06Q 50/265; G06Q 50/40
See application file for complete search history.

(56) References Cited

U.S. PATENT DOCUMENTS

| | | | |
|---|---|---|---|
| 6,437,688 | B1 | 8/2002 | Kobayashi |
| 6,459,371 | B1 | 10/2002 | Pike |

(Continued)

FOREIGN PATENT DOCUMENTS

| | | |
|---|---|---|
| GB | 2522728 | 8/2015 |
| JP | 2012126273 | 7/2012 |

(Continued)

OTHER PUBLICATIONS

Clark, Best medical alerts for caregivers, The Senior List, Retrieved from httpszllwwwtheseniorlist.com/medical-alert-systems/best/caregivers/, Mar. 2019, 110 pages. Mar. 2019.

(Continued)

*Primary Examiner* — Joshua L Schwartz
(74) *Attorney, Agent, or Firm* — BRYAN CAVE LEIGHTON PAISNER LLP

(57) ABSTRACT

Method and system for determining a status of a mobile device of a user are disclosed. For example, the method includes receiving first sensor data at a first time from an application installed on a mobile device of a user, determining a first location of the mobile device, immediately subsequent to receiving the first sensor data at the first time, receiving second sensor data at a second time from the application, the second time following the first time by a time interval, determining a second location of the mobile device, determining a distance between the first location and the second location, determining whether the distance corresponding to the time interval exceeds a predetermined threshold, and determining whether a trip log indicative of at least one trip during the time interval is received from the application.

20 Claims, 6 Drawing Sheets

100

Receive a first set of sensor data at a first time from an application installed on a mobile device of a user — 102

Determine a first location of the mobile device based at least in part upon the first set of sensor data, the first location corresponding to the first time — 104

Receive a second set of sensor data at a second time from the application immediately subsequent to receiving the first set of sensor data at the first time, the second time following the first time by a time interval — 106

Determine a second location of the mobile device based at least in part upon the second set of sensor data, the second location corresponding to the second time — 108

Determine a distance between the first location and the second location, the distance corresponding to the time interval from the first time to the second time — 110

Determine whether the distance corresponding to the time interval exceeds a predetermined threshold — 112

Determine whether a trip log indicative of at least one trip during the time interval is received from the application — 114

Related U.S. Application Data continuation of application No. 16/913,782, filed on Jun. 26, 2020, now Pat. No. 11,399,261.

(56)         References Cited

U.S. PATENT DOCUMENTS

| | | | |
|---|---|---|---|
| 6,868,386 | B1 | 3/2005 | Henderson et al. |
| 7,280,898 | B2 | 10/2007 | Lesesky et al. |
| 7,421,334 | B2 | 9/2008 | Dahlgren et al. |
| 8,117,049 | B2 | 2/2012 | Berkobin et al. |
| 8,311,858 | B2 | 11/2012 | Everett et al. |
| 8,606,512 | B1 | 12/2013 | Bogovich et al. |
| 8,731,768 | B2 | 5/2014 | Fernandes et al. |
| 8,731,977 | B1 | 5/2014 | Hardin et al. |
| 8,799,032 | B2 | 8/2014 | Fernandes et al. |
| 8,805,707 | B2 | 8/2014 | Schuman, Jr. et al. |
| 8,862,486 | B2 | 10/2014 | Cordova et al. |
| 8,922,393 | B2 | 12/2014 | Ricci |
| 8,924,240 | B2 | 12/2014 | Depura et al. |
| 8,935,036 | B1 * | 1/2015 | Christensen ......... G08G 1/0129 |
| | | | 701/29.3 |
| 9,014,911 | B2 | 4/2015 | Ricci |
| 9,031,545 | B1 | 5/2015 | Srey et al. |
| 9,037,394 | B2 | 5/2015 | Fernandes et al. |
| 9,043,130 | B2 | 5/2015 | Ricci |
| 9,046,374 | B2 | 6/2015 | Ricci |
| 9,047,778 | B1 | 6/2015 | Cazanas et al. |
| 9,105,051 | B2 | 8/2015 | Ricci |
| 9,111,316 | B2 | 8/2015 | Fernandes et al. |
| 9,123,058 | B2 | 9/2015 | Ricci |
| 9,129,449 | B2 | 9/2015 | Davidson |
| 9,159,232 | B2 | 10/2015 | Ricci |
| 9,164,957 | B2 | 10/2015 | Hassib et al. |
| 9,176,924 | B2 | 11/2015 | Ricci |
| 9,240,018 | B2 | 1/2016 | Ricci |
| 9,278,689 | B1 | 3/2016 | Delp |
| 9,311,271 | B2 | 4/2016 | Wright |
| 9,355,423 | B1 | 5/2016 | Slusar |
| 9,390,451 | B1 | 7/2016 | Slusar |
| 9,398,423 | B2 | 7/2016 | Cordova et al. |
| 9,421,864 | B1 | 8/2016 | Srey et al. |
| 9,443,270 | B1 | 9/2016 | Friedman et al. |
| 9,454,786 | B1 | 9/2016 | Srey et al. |
| 9,558,520 | B2 | 1/2017 | Peak et al. |
| 9,591,083 | B1 | 3/2017 | Gumbula et al. |
| 9,619,203 | B2 | 4/2017 | Tamir et al. |
| 9,633,318 | B2 | 4/2017 | Plante |
| 9,633,487 | B2 | 4/2017 | Wright |
| 9,672,569 | B2 | 6/2017 | Fernandes et al. |
| 9,672,571 | B2 | 6/2017 | Fernandes et al. |
| 9,679,487 | B1 | 6/2017 | Hayward |
| 9,783,159 | B1 | 10/2017 | Potter et al. |
| 9,786,154 | B1 | 10/2017 | Potter et al. |
| 9,832,241 | B1 | 11/2017 | Hayward |
| 9,836,062 | B1 | 12/2017 | Hayward |
| 9,836,962 | B1 | 12/2017 | Hayward |
| 9,836,963 | B1 | 12/2017 | Hayward |
| 9,841,286 | B1 | 12/2017 | Hayward |
| 9,841,287 | B1 | 12/2017 | Hayward |
| 9,841,767 | B1 | 12/2017 | Hayward |
| 9,842,496 | B1 | 12/2017 | Hayward |
| 9,904,289 | B1 | 2/2018 | Hayward |
| 9,911,159 | B1 | 3/2018 | Srey et al. |
| 9,932,033 | B2 | 4/2018 | Slusar et al. |
| 9,972,209 | B1 | 5/2018 | Hayward |
| 10,007,263 | B1 | 6/2018 | Fields et al. |
| 10,008,111 | B1 | 6/2018 | Grant |
| 10,012,987 | B2 | 7/2018 | Shem et al. |
| 10,023,114 | B2 | 7/2018 | Adams et al. |
| 10,032,226 | B1 | 7/2018 | Suizzo et al. |
| 10,037,578 | B2 | 7/2018 | Bogovich et al. |
| 10,037,579 | B2 | 7/2018 | Bogovich et al. |
| 10,037,580 | B2 | 7/2018 | Bogovich et al. |
| 10,042,363 | B1 | 8/2018 | Hayward |
| 10,042,364 | B1 | 8/2018 | Hayward |
| 10,054,453 | B1 | 8/2018 | Hayward |
| 10,055,982 | B1 | 8/2018 | Hayward |
| 10,055,985 | B1 | 8/2018 | Hayward |
| 10,057,312 | B1 | 8/2018 | Hayward |
| 10,074,139 | B2 | 9/2018 | Bogovich et al. |
| 10,089,868 | B1 | 10/2018 | Hayward |
| 10,096,038 | B2 | 10/2018 | Ramirez et al. |
| 10,096,067 | B1 | 10/2018 | Slusar |
| 10,096,070 | B1 | 10/2018 | Slusar et al. |
| 10,109,016 | B1 | 10/2018 | Saenglongma |
| 10,121,204 | B1 | 11/2018 | Brandmaier et al. |
| 10,134,091 | B2 | 11/2018 | Adams et al. |
| 10,157,422 | B2 | 12/2018 | Jordan et al. |
| 10,169,822 | B2 | 1/2019 | Jarvis et al. |
| 10,192,369 | B2 | 1/2019 | Wright |
| 10,198,772 | B2 | 2/2019 | Parameshwaran |
| 10,198,879 | B2 | 2/2019 | Wright |
| 10,210,772 | B2 | 2/2019 | Tamir et al. |
| 10,215,573 | B1 | 2/2019 | Hayward |
| 10,216,194 | B1 | 2/2019 | Hayward |
| 10,216,195 | B2 | 2/2019 | Switkes et al. |
| 10,217,169 | B2 | 2/2019 | Schumann, Jr. et al. |
| 10,229,462 | B2 | 3/2019 | Bogovich et al. |
| 10,231,093 | B2 | 3/2019 | Cordova et al. |
| 10,234,871 | B2 | 3/2019 | Klaus et al. |
| 10,255,638 | B2 | 4/2019 | Cote et al. |
| 10,255,639 | B1 | 4/2019 | Friedman et al. |
| 10,317,223 | B1 | 6/2019 | Hayward |
| 10,354,333 | B1 | 7/2019 | Hayward |
| 10,354,461 | B1 | 7/2019 | Hayward |
| 10,359,782 | B1 | 7/2019 | Hayward |
| 10,360,636 | B1 | 7/2019 | Kraft et al. |
| 10,360,794 | B1 | 7/2019 | Hayward |
| 10,365,662 | B1 | 7/2019 | Hayward |
| 10,366,605 | B1 | 7/2019 | Hayward |
| 10,373,497 | B1 | 8/2019 | Hayward |
| 10,380,694 | B1 | 8/2019 | Grant et al. |
| 10,380,699 | B2 | 8/2019 | Fernandes et al. |
| 10,380,904 | B1 | 8/2019 | Hayward |
| 10,395,319 | B1 | 8/2019 | Srey et al. |
| 10,395,320 | B1 | 8/2019 | Srey et al. |
| 10,417,713 | B1 | 9/2019 | Brandmaier et al. |
| 10,438,424 | B2 | 10/2019 | Hassib et al. |
| 10,445,758 | B1 | 10/2019 | Bryer et al. |
| 10,451,427 | B1 | 10/2019 | Hayward |
| 10,453,338 | B1 | 10/2019 | Hayward |
| 10,453,352 | B1 | 10/2019 | Hayward |
| 10,509,414 | B1 | 12/2019 | Hayward |
| 10,546,491 | B1 | 1/2020 | Hayward |
| 10,571,908 | B2 | 2/2020 | Joyce et al. |
| 10,572,943 | B1 | 2/2020 | Tye et al. |
| 10,634,507 | B2 | 4/2020 | Krishnan et al. |
| 10,657,597 | B1 | 5/2020 | Billman et al. |
| 10,664,918 | B1 | 5/2020 | Slusar |
| 10,699,350 | B1 | 6/2020 | Suizzo et al. |
| 10,726,495 | B1 | 7/2020 | Saenglongma |
| 10,726,687 | B2 | 7/2020 | Song et al. |
| 10,733,673 | B1 | 8/2020 | Slusar |
| 10,740,850 | B1 | 8/2020 | Slusar |
| 10,755,495 | B1 | 8/2020 | Chan et al. |
| 10,755,566 | B2 | 8/2020 | Tennent et al. |
| 10,775,179 | B1 | 9/2020 | Hayward |
| 10,783,586 | B1 | 9/2020 | Augustine et al. |
| 10,783,587 | B1 | 9/2020 | Augustine et al. |
| 10,787,122 | B2 | 9/2020 | Adams et al. |
| 10,796,369 | B1 | 10/2020 | Augustine et al. |
| 10,803,525 | B1 | 10/2020 | Augustine et al. |
| 10,803,529 | B2 | 10/2020 | Adams et al. |
| 10,810,681 | B1 | 10/2020 | Parker et al. |
| 10,831,191 | B1 | 11/2020 | Fields et al. |
| 10,977,943 | B1 | 4/2021 | Hayward |
| 11,004,280 | B1 | 5/2021 | Hayward |
| 11,048,269 | B1 | 6/2021 | Hayward |
| 11,061,408 | B1 | 7/2021 | Hayward |
| 11,105,640 | B1 | 8/2021 | Hayward |
| 11,145,000 | B1 | 10/2021 | Baker et al. |
| 11,363,426 | B1 | 6/2022 | Sanchez |
| 2005/0065711 | A1 | 3/2005 | Dahlgren et al. |
| 2007/0054685 | A1 | 3/2007 | Kellum |
| 2007/0159354 | A1 | 7/2007 | Rosenberg |

(56) References Cited

U.S. PATENT DOCUMENTS

| | | |
|---|---|---|
| 2007/0174467 A1 | 7/2007 | Ballou et al. |
| 2008/0270519 A1 | 10/2008 | Ekdahl et al. |
| 2009/0024419 A1 | 1/2009 | Mcclellan et al. |
| 2009/0043435 A1* | 2/2009 | Kane ..................... B61L 25/025 |
| | | 701/19 |
| 2010/0015963 A1 | 1/2010 | Hesse et al. |
| 2010/0191391 A1 | 7/2010 | Zeng |
| 2010/0286864 A1 | 11/2010 | Kawauchi et al. |
| 2010/0312466 A1 | 12/2010 | Katzer et al. |
| 2011/0161116 A1 | 6/2011 | Peak et al. |
| 2012/0101855 A1 | 4/2012 | Collins et al. |
| 2012/0176254 A1 | 7/2012 | Imanaga et al. |
| 2012/0303392 A1 | 11/2012 | Depura et al. |
| 2012/0316777 A1 | 12/2012 | Kitta |
| 2013/0006675 A1 | 1/2013 | Bowne et al. |
| 2013/0013347 A1 | 1/2013 | Ling et al. |
| 2013/0013348 A1 | 1/2013 | Ling et al. |
| 2013/0030642 A1 | 1/2013 | Bradley et al. |
| 2013/0081029 A1 | 3/2013 | Levien et al. |
| 2013/0081030 A1 | 3/2013 | Levien et al. |
| 2013/0090139 A1 | 4/2013 | McHenry et al. |
| 2013/0169812 A1 | 7/2013 | Lu et al. |
| 2014/0046701 A1 | 2/2014 | Steinberg et al. |
| 2014/0081675 A1 | 3/2014 | Ives et al. |
| 2014/0142799 A1 | 5/2014 | Ferguson et al. |
| 2014/0309806 A1 | 10/2014 | Ricci |
| 2014/0309870 A1 | 10/2014 | Ricci et al. |
| 2014/0309880 A1 | 10/2014 | Ricci |
| 2014/0309886 A1 | 10/2014 | Ricci |
| 2014/0309891 A1 | 10/2014 | Ricci |
| 2014/0310594 A1 | 10/2014 | Ricci et al. |
| 2014/0310610 A1 | 10/2014 | Ricci |
| 2014/0310739 A1 | 10/2014 | Ricci et al. |
| 2014/0320260 A1 | 10/2014 | Van Wiemeersch et al. |
| 2014/0330596 A1 | 11/2014 | Depura et al. |
| 2015/0025917 A1 | 1/2015 | Stempora |
| 2015/0077236 A1 | 3/2015 | Le Masurier |
| 2015/0127570 A1 | 5/2015 | Doughty et al. |
| 2015/0145995 A1 | 5/2015 | Shahraray et al. |
| 2015/0156603 A1 | 6/2015 | Zellner |
| 2015/0179062 A1 | 6/2015 | Ralston et al. |
| 2015/0232065 A1 | 8/2015 | Ricci et al. |
| 2015/0262487 A1 | 9/2015 | Cazanas et al. |
| 2015/0266473 A1 | 9/2015 | Hayasaka |
| 2015/0353014 A1 | 12/2015 | Li |
| 2016/0021178 A1 | 1/2016 | Liu et al. |
| 2016/0042644 A1 | 2/2016 | Velusamy |
| 2016/0098369 A1 | 4/2016 | Berkobin |
| 2016/0192108 A1 | 6/2016 | Chaudhary et al. |
| 2016/0196744 A1 | 7/2016 | Razmi |
| 2016/0205419 A1 | 7/2016 | Ricci et al. |
| 2016/0232791 A1 | 8/2016 | Tosa et al. |
| 2016/0277601 A1 | 9/2016 | Seymour |
| 2016/0334227 A1 | 11/2016 | Davidson |
| 2017/0021764 A1 | 1/2017 | Adams et al. |
| 2017/0030725 A1 | 2/2017 | Gordon et al. |
| 2017/0075701 A1 | 3/2017 | Ricci et al. |
| 2017/0113664 A1 | 4/2017 | Nix |
| 2017/0120906 A1 | 5/2017 | Penilla et al. |
| 2017/0178498 A1 | 6/2017 | Mcerlean |
| 2017/0337813 A1 | 11/2017 | Taylor |
| 2018/0022327 A1 | 1/2018 | Kitagawa et al. |
| 2018/0025648 A1 | 1/2018 | Zlojutro |
| 2018/0096601 A1 | 4/2018 | Chow et al. |
| 2018/0144633 A1 | 5/2018 | Minemura et al. |
| 2018/0201263 A1 | 7/2018 | Slusar et al. |
| 2019/0347925 A1 | 11/2019 | Faltaous et al. |
| 2020/0267253 A1 | 8/2020 | Grunfeld |
| 2020/0364661 A1* | 11/2020 | Yamasaki .............. G06Q 10/20 |
| 2021/0041868 A1 | 2/2021 | Fields et al. |

FOREIGN PATENT DOCUMENTS

| | | | |
|---|---|---|---|
| JP | 2012126273 A | * | 7/2012 |
| KR | 20180074422 | | 7/2018 |
| WO | 2018102280 | | 6/2018 |
| WO | 2021207960 | | 10/2021 |

OTHER PUBLICATIONS

Mann, Building the perfect usage-based insurance mobile app, Insurance Innovation Reporter, Retrieved from https://iireporter.com/building-the-perfect-usage-based-insurance-mobile-app/, Feb. 2016, pp. 1-9. Feb. 2016.

Palmer, The apps that can track you even after you've uninstalled them, Science & Tech, Daily Mail. Retrieved from https://www.dailymail.co.uk/sciencetech/article-6304761/The-apps-track-you've-uninstalled-them.html, Oct. 2018, pp. 1-27. Oct. 2018.

SmartDriver app frequently asked questions, Only Young Drivers, Retrieved from https://www.onlyyoungdriver.co.uk/only-young-driver-faq's/smartdriver-app-faq's#, Oct. 2019, 5 pages. Oct. 2019.

The Ultimate guide to GPS Tracking for business, Linxup., Retrieved from https://www.linxup.com/thankypu/assets/downloads/ultimate_guide_to_gps.pdf, Oct. 2019, 18 pages. Oct. 2019.

* cited by examiner

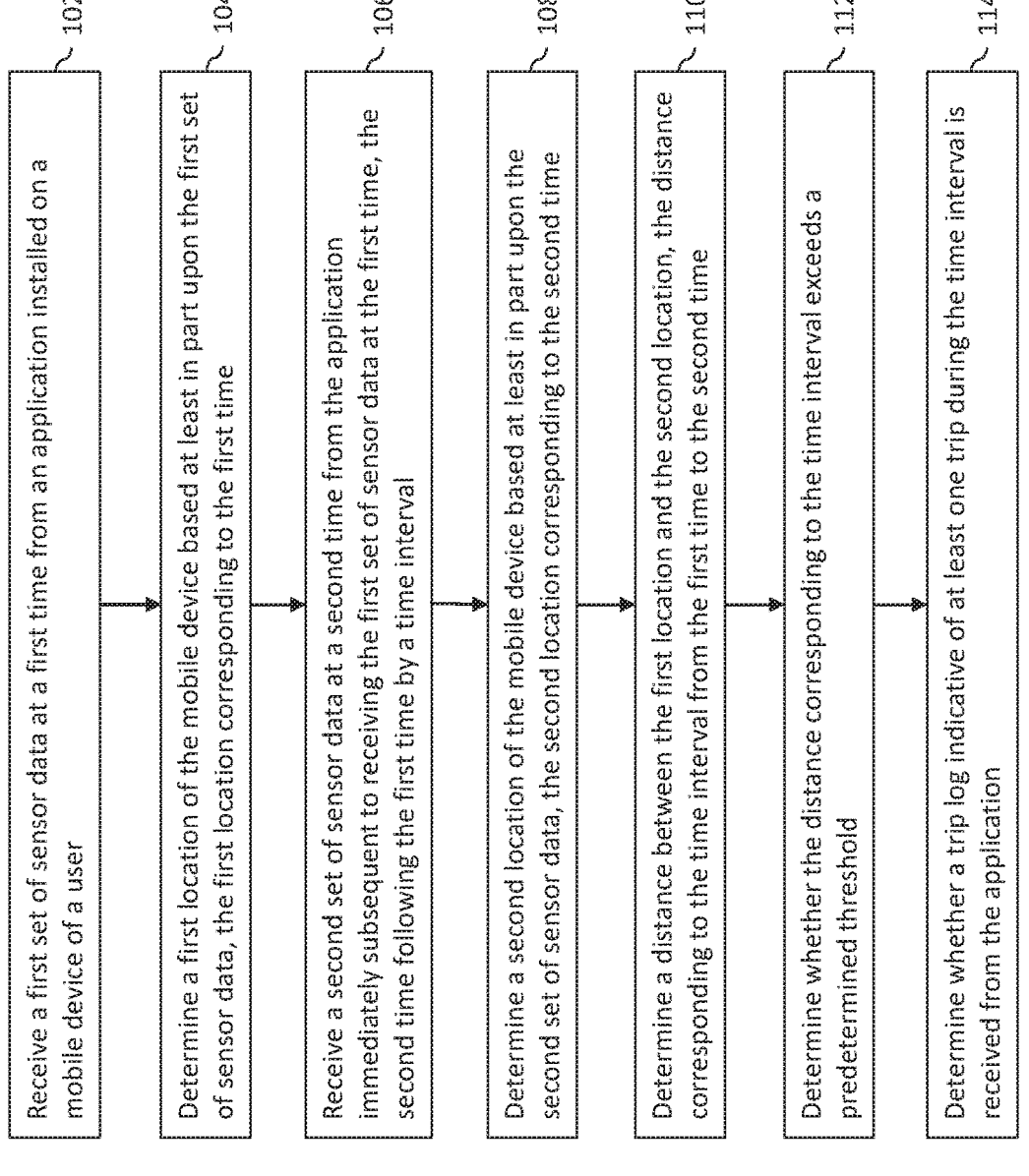

Receive a first set of sensor data at a first time from an application installed on a mobile device of a user ⟋ 102

Determine a first location of the mobile device based at least in part upon the first set of sensor data, the first location corresponding to the first time ⟋ 104

Receive a second set of sensor data at a second time from the application immediately subsequent to receiving the first set of sensor data at the first time, the second time following the first time by a time interval ⟋ 106

Determine a second location of the mobile device based at least in part upon the second set of sensor data, the second location corresponding to the second time ⟋ 108

Determine a distance between the first location and the second location, the distance corresponding to the time interval from the first time to the second time ⟋ 110

Determine whether the distance corresponding to the time interval exceeds a predetermined threshold ⟋ 112

Determine whether a trip log indicative of at least one trip during the time interval is received from the application ⟋ 114

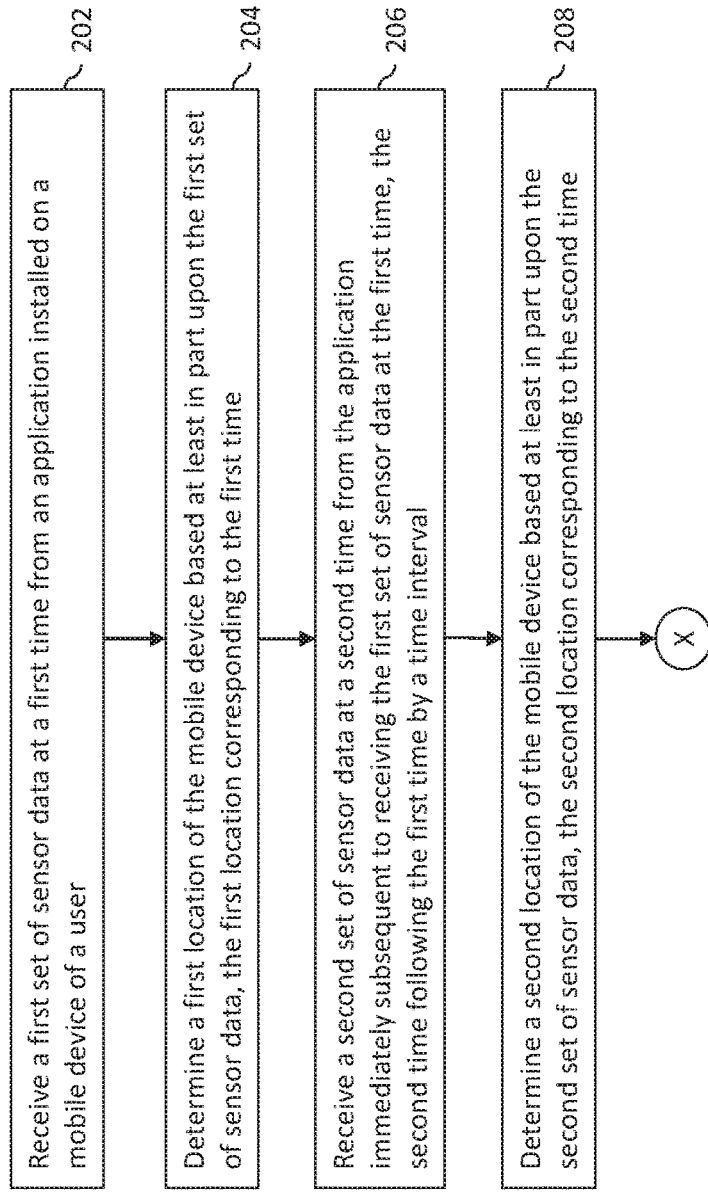

Receive a first set of sensor data at a first time from an application installed on a mobile device of a user ~202

Determine a first location of the mobile device based at least in part upon the first set of sensor data, the first location corresponding to the first time ~204

Receive a second set of sensor data at a second time from the application immediately subsequent to receiving the first set of sensor data at the first time, the second time following the first time by a time interval ~206

Determine a second location of the mobile device based at least in part upon the second set of sensor data, the second location corresponding to the second time ~208

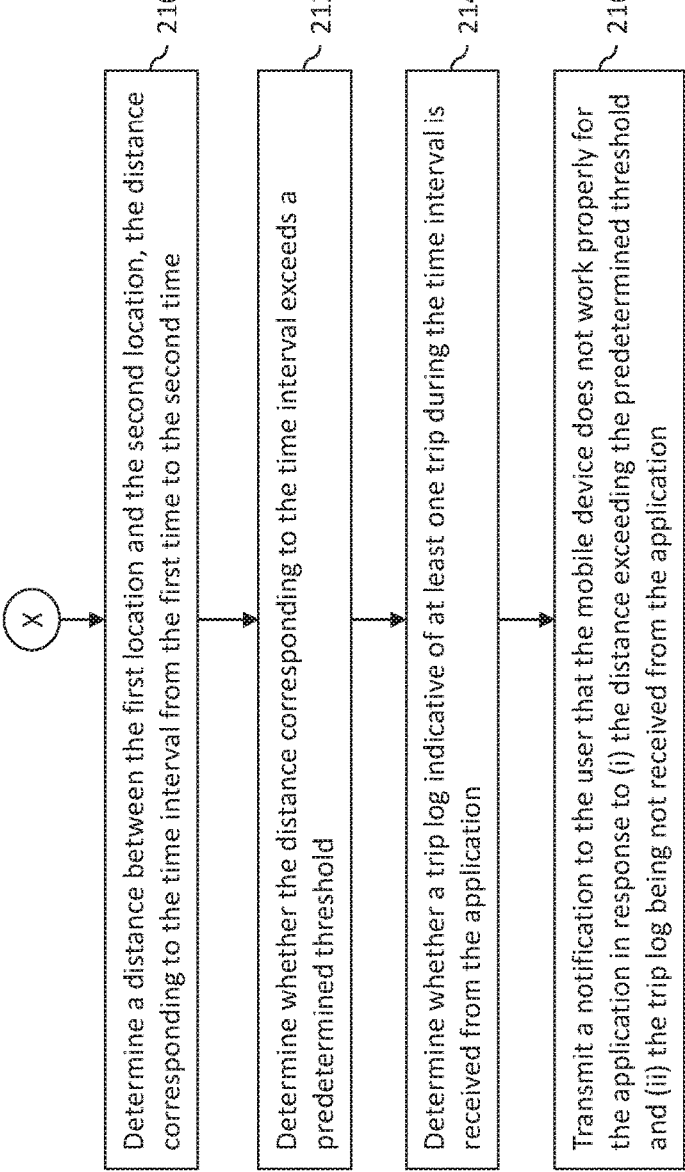

200

Determine a distance between the first location and the second location, the distance corresponding to the time interval from the first time to the second time 210

Determine whether the distance corresponding to the time interval exceeds a predetermined threshold 212

Determine whether a trip log indicative of at least one trip during the time interval is received from the application 214

Transmit a notification to the user that the mobile device does not work properly for the application in response to (i) the distance exceeding the predetermined threshold and (ii) the trip log being not received from the application 216

Figure 2B

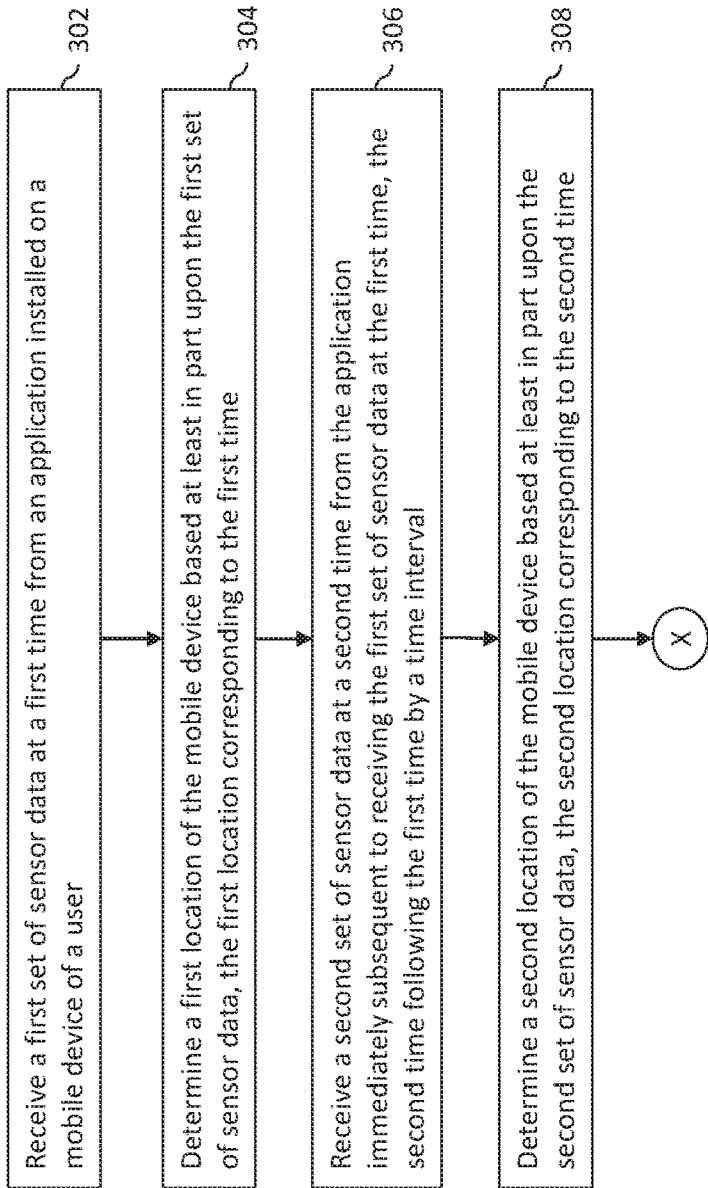

302 — Receive a first set of sensor data at a first time from an application installed on a mobile device of a user 304 — Determine a first location of the mobile device based at least in part upon the first set of sensor data, the first location corresponding to the first time 306 — Receive a second set of sensor data at a second time from the application immediately subsequent to receiving the first set of sensor data at the first time, the second time following the first time by a time interval 308 — Determine a second location of the mobile device based at least in part upon the second set of sensor data, the second location corresponding to the second time

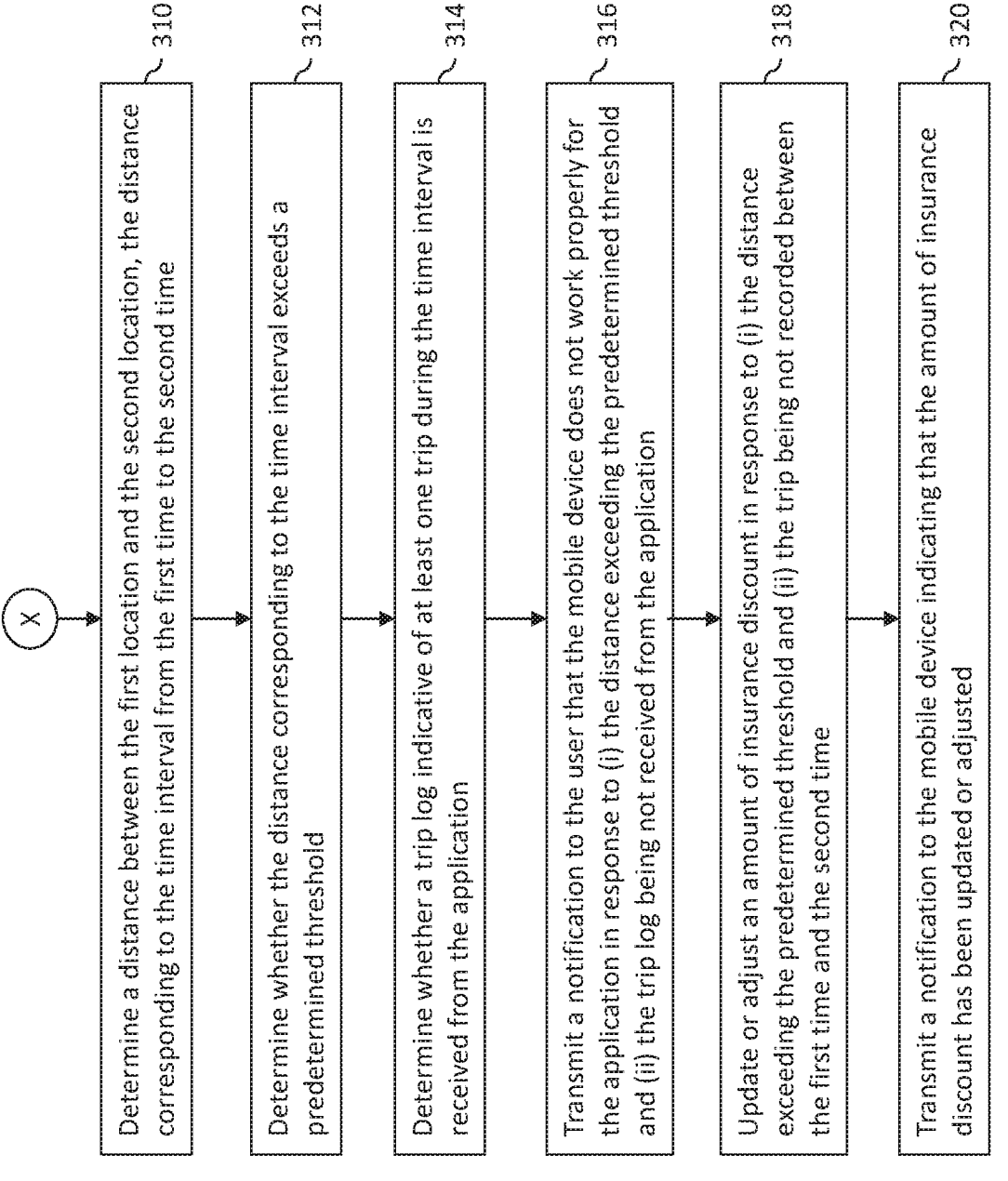

Determine a distance between the first location and the second location, the distance corresponding to the time interval from the first time to the second time — 310

Determine whether the distance corresponding to the time interval exceeds a predetermined threshold — 312

Determine whether a trip log indicative of at least one trip during the time interval is received from the application — 314

Transmit a notification to the user that the mobile device does not work properly for the application in response to (i) the distance exceeding the predetermined threshold and (ii) the trip log being not received from the application — 316

Update or adjust an amount of insurance discount in response to (i) the distance exceeding the predetermined threshold and (ii) the trip being not recorded between the first time and the second time — 318

Transmit a notification to the mobile device indicating that the amount of insurance discount has been updated or adjusted — 320

SYSTEMS AND METHODS FOR DETERMINING MOBILE DEVICE STATUS

This application is a continuation of U.S. patent application Ser. No. 17/742,453, filed May 12, 2022, which is a continuation of U.S. patent application Ser. No. 16/913,782, filed Jun. 26, 2020, the entire disclosures of which being expressly incorporated by reference herein for all purposes.

FIELD OF THE DISCLOSURE

Some embodiments of the present disclosure are directed to determining a status of a mobile device. More particularly, certain embodiments of the present disclosure provide methods and systems for determining a status of a mobile device of a user based at least in part upon a receipt of sensor data of the mobile device. Merely by way of example, the present disclosure has been applied to determining that the mobile device is working properly and that the sensor data is reliable. But it would be recognized that the present disclosure has much broader range of applicability.

BACKGROUND OF THE DISCLOSURE

An application installed on mobile devices of users may provide data generated by one or more sensors of the mobile devices that is related to user behaviors, such as driving behaviors. Such data may be used to generate alert notifications to the users that may reduce the likelihood of a collision or other damage occurring to the vehicles or the users. In other words, the use of the application may function to mitigate or prevent driving risks. Hence it is highly desirable to develop more accurate techniques for determining that the mobile device is working properly to provide reliable sensor data.

BRIEF SUMMARY OF THE DISCLOSURE

Some embodiments of the present disclosure are directed to determining a status of a mobile device. More particularly, certain embodiments of the present disclosure provide methods and systems for determining a status of a mobile device of a user based at least in part upon a receipt of sensor data of the mobile device. Merely by way of example, the present disclosure has been applied to determining that the mobile device is working properly and that the sensor data is reliable. But it would be recognized that the present disclosure has much broader range of applicability.

According to some embodiments, a method for determining a status of a mobile device of a user includes receiving first sensor data at a first time from an application installed on a mobile device of a user and determining a first location of the mobile device based at least in part upon the first sensor data. The first location corresponds to the first time. The method further includes immediately subsequent to receiving the first sensor data at the first time, receiving second sensor data at a second time from the application and determining a second location of the mobile device based at least in part upon the second sensor data. The second time follows the first time by a time interval, and the second location corresponds to the second time. Additionally, the method includes determining a distance between the first location and the second location. The distance corresponds to the time interval from the first time to the second time. Moreover, the method includes determining whether the distance corresponding to the time interval exceeds a predetermined threshold and determining whether a trip log indicative of at least one trip during the time interval is received from the application.

According to certain embodiments, a computing device for determining a status of a mobile device of a user includes one or more processors and a memory that stores instructions for execution by the one or more processors. The instructions, when executed, cause the one or more processors to receive first sensor data at a first time from an application installed on a mobile device of a user and determine a first location of the mobile device based at least in part upon the first sensor data. The first location corresponds to the first time. Also, the instructions, when executed, cause the one or more processors to immediately subsequent to receiving the first sensor data at the first time, receive second sensor data at a second time from the application and determine a second location of the mobile device based at least in part upon the second sensor data. The second time follows the first time by a time interval, and the second location corresponds to the second time. Additionally, the instructions, when executed, cause the one or more processors to determine a distance between the first location and the second location. The distance corresponds to the time interval from the first time to the second time. Moreover, the instructions, when executed, cause the one or more processors to determine whether the distance corresponding to the time interval exceeds a predetermined threshold and determine whether a trip log indicative of at least one trip during the time interval is received from the application.

According to some embodiments, a non-transitory computer-readable medium stores instructions for determining a status of a mobile device of a user. The instructions are executed by one or more processors of a computing device. The non-transitory computer-readable medium includes instructions to receive first sensor data at a first time from an application installed on a mobile device of a user and determine a first location of the mobile device based at least in part upon the first sensor data. The first location corresponds to the first time. Also, the non-transitory computer-readable medium includes instructions to immediately subsequent to receiving the first sensor data at the first time, receive second sensor data at a second time from the application and determine a second location of the mobile device based at least in part upon the second sensor data. The second time follows the first time by a time interval, and the second location corresponds to the second time. Additionally, the non-transitory computer-readable medium includes instructions to determine a distance between the first location and the second location. The distance corresponds to the time interval from the first time to the second time. Moreover, the non-transitory computer-readable medium includes instructions to determine whether the distance corresponding to the time interval exceeds a predetermined threshold and determine whether a trip log indicative of at least one trip during the time interval is received from the application.

Depending upon the embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 1 is a simplified diagram showing a method for determining a status of a mobile device of a user according to certain embodiments of the present disclosure.

FIGS. 2A and 2B are simplified diagrams showing a method for determining a status of a mobile device of a user according to some embodiments of the present disclosure.

FIGS. 3A and 3B are simplified diagrams showing a method for determining a status of a mobile device of a user according to certain embodiments of the present disclosure.

DETAILED DESCRIPTION OF THE DISCLOSURE

Figure 4:
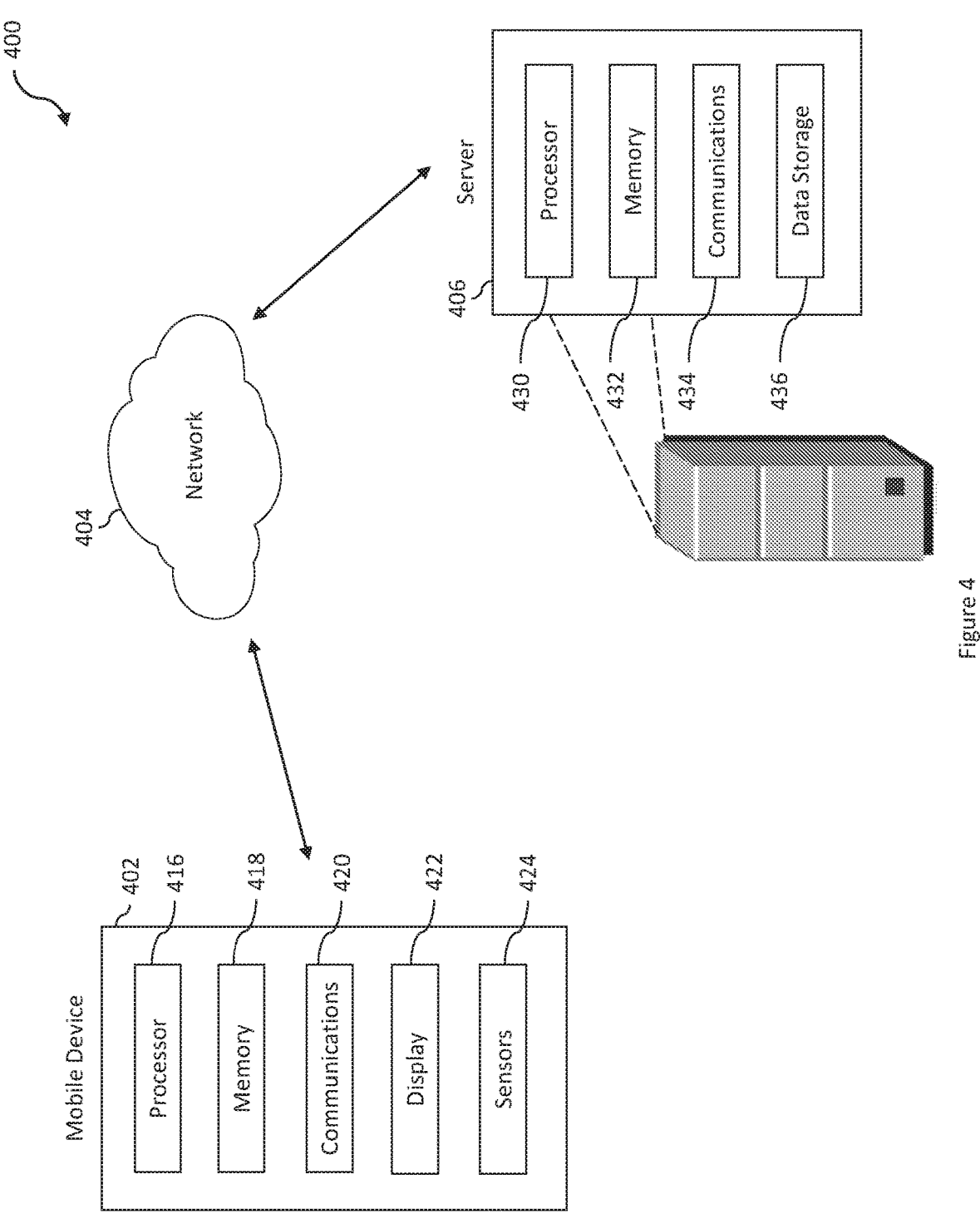
FIG. 4 is a simplified diagram showing a system for determining a status of a mobile device of a user according to certain embodiments of the present disclosure.

Some embodiments of the present disclosure are directed to determining a status of a mobile device. More particularly, certain embodiments of the present disclosure provide methods and systems for determining a status of a mobile device of a user based at least in part upon a receipt of sensor data of the mobile device. Merely by way of example, the present disclosure has been applied to determining that the mobile device is working properly and that the sensor data is reliable. But it would be recognized that the present disclosure has much broader range of applicability.

I. ONE OR MORE METHODS FOR DETERMINING A STATUS OF A MOBILE DEVICE ACCORDING TO CERTAIN EMBODIMENTS

FIG. 1 is a simplified diagram showing a method 100 for determining a status of a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 100 is performed by a computing device (e.g., a server 406 that is communicatively coupled to the mobile device). However, it should be appreciated that, in some embodiments, some of the method 100 is performed by the mobile device.

The method 100 includes process 102 for receiving a first set of sensor data at a first time from an application installed on a mobile device of a user, process 104 for determining a first location of the mobile device based at least in part upon the first set of sensor data, process 106 for receiving a second set of sensor data at a second time from the application, process 108 for determining a second location of the mobile device based at least in part upon the second set of sensor data, process 110 for determining a distance between the first location and the second location, process 112 for determining whether the distance corresponding to the time interval exceeds a predetermined threshold, and process 114 for determining whether a trip log indicative of at least one trip during the time interval is received from the application. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 100 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 102, the application that is installed on the mobile device is configured to transmit the first set of sensor data that was collected and/or generated by one or more sensors of the mobile device according to some embodiments. For example, the application broadcasts the first set of sensor data to be received by nearby devices and/or directly transmits the first set of sensor data to a destination computing device (e.g., a server that is communicatively coupled to the mobile device). In response, the computing device receives the first set of sensor data at the first time. According to certain embodiments, the first set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the first set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements.

According to some embodiments, the application is configured to transmit the first set of sensor data periodically every first predetermined time interval when the application is triggered by a predetermined event. For example, in other words, the application works properly in the background and does not transmit any sensor data until the predetermined event occurs. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

According to some embodiments, the computing device determines that the application has been installed on the mobile device of the user if the computing device receives or detects the first set of sensor data that is transmitted by the application. However, in some other embodiments, the computing device determines that the application has been installed on the mobile device by monitoring a download of the application on the mobile device and/or a usage of the application by the user of the mobile device (e.g., account login activities).

At the process 104, the first location of the mobile device is determined based at least in part upon the first set of sensor data received from the mobile device. In the illustrative embodiment, the first location corresponds to the first time. For example, the first location of the mobile device corresponds to the location at which the mobile device was located at the time of the first set of sensor data was received. However, in some embodiments, the first location of the mobile device corresponds to the location at which the mobile device was located at the time of the first set of sensor data was generated or collected by the mobile device.

At the process 106, the application that is installed on the mobile device is configured to transmit the second set of sensor data that was collected and/or generated by one or more sensors of the mobile device according to some embodiments. For example, the application broadcasts the second set of sensor data to be received by nearby devices and/or directly transmits the second set of sensor data to a destination computing device (e.g., a server that is communicatively coupled to the mobile device). In response, the computing device receives the second set of sensor data at the second time. In the illustrative embodiment, the second set of sensor data is a set of sensor data that is received from the mobile device by the computing device immediately subsequent to receiving the first set of sensor data. In other words, the second time follows the first time by a time interval, such that the second set of sensor data is the next sensor data that is being transmitted subsequent to the transmission of the first set of sensor data. However, it should be appreciated that, in some embodiments, the computing device may receive data from the mobile device. It should be appreciated that, in certain embodiments, the second set of sensor data includes sensor data that has been collected or generated from the same sensors of the mobile device that generated the first set of sensor data.

According to certain embodiments, the second set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the second set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the second set of sensor data is collected continuously or at predetermined time intervals. According to certain embodiments, the second set of sensor data is collected based on a triggering event. For example, the second set of sensor data is collected when each sensor has acquired a threshold amount of sensor measurements.

According to some embodiments, the application is configured to transmit the second set of sensor data periodically every second predetermined time interval when the application is triggered by a predetermined event. For example, in other words, the application works properly in the background and does not transmit any sensor data until the predetermined event occurs. It should be appreciated that, in some embodiments, the second predetermined time interval is the same as the first predetermined time interval. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

At the process 108, the second location of the mobile device is determined based at least in part upon the second set of sensor data received from the mobile device. In the illustrative embodiment, the second location corresponds to the second time. For example, the second location of the mobile device corresponds to the location at which the mobile device was located at the time of the second set of sensor data was received. However, in some embodiments, the second location of the mobile device corresponds to the location at which the mobile device was located at the time of the second set of sensor data was generated or collected by the mobile device.

At the process 110, the distance between the first location and the second location is determined. In the illustrative embodiment, the distance corresponds to the time interval from the first time to the second time. In other words, the computing device determines the distance that the mobile device has travelled between the first location at the first time and the second location at the second time. It should be appreciated that no sensor data has been received from the application of the mobile device between the first time and the second time.

At the process 112, the computing device determines whether the distance corresponding to the time interval exceeds the predetermined threshold. According to some embodiments, the predetermined threshold indicates a distance that is expected or estimated based upon a time duration between the first time and the second time. According to certain embodiments, the predetermined threshold is tailored to the user of the mobile device. For example, the predetermined threshold is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data. For example, if the user typically drives 20 miles to and from work between 8 AM-9 AM and 5 PM-6 PM, 5 days (Mondays to Fridays) a week, the predetermined threshold between those time slots is set to 25 miles.

According to some embodiments, the predetermined threshold is determined using one or more machine learning algorithms, programs, modules, or models based upon the historical sensor data and/or information received from the user. According to certain embodiments, the predetermined threshold is defined and provided by the insurer.

In the illustrative embodiment, the computing device determines that the first and second sensor data is unreliable if the distance between the first and second locations exceeds the predetermined threshold. For example, in some embodiments, the distance exceeding the predetermined threshold indicates that the mobile device was turned off between the first time and the second time. In certain embodiments, the distance exceeding the predetermined threshold indicates that the application of the mobile device was inactivated or not working properly between the first and the second time.

At the process 114, if the computing device determines that the distance between the first and second locations exceeds the predetermined threshold, the computing device determines that the mobile device is not functioning properly between the first time and the second time according to some embodiments. For example, if the mobile device was not functioning properly, then the sensor data may not be accurate or reliable. To confirm the reliability of the first and the second data, the computing device determines whether the trip log is received from the application of the mobile device. The trip log indicates at least one trip during the time interval.

According to some embodiments, the application of the mobile device collects and logs trip data based upon a triggering event. For example, the application detects the triggering event when one or more sensors of the mobile device acquires a respective threshold amount of sensor measurements associated with the triggering event. In some embodiments, if the triggering event is a driving event, the application is configured to detect whether the mobile device is located in a moving vehicle based at least upon the sensor measurements. For example, if the mobile device is detected to be located in the moving vehicle, the application determines that a trip has started and collects trip data associated with the trip. In such example, the trip is logged, and the trip data is stored on the mobile device. For example, the trip log is logged in an internal memory 418 of the mobile device 402 as shown in FIG. 4.

In some embodiments, the trip log includes detailed sensor data from one or more sensors of the mobile device indicative of driving behavior. In certain embodiments, the mobile device communicates with the vehicle to obtain vehicle operation data. In such embodiments, the trip log further includes vehicle operation data received from the vehicle.

As discussed above, according to some embodiments, the sensor data is not continuously collected or generated by the one or more sensors of the mobile device. Even if the sensor data is continuously generated, the trip log is not transmitted continuously throughout the day as the sensor data is being generated to preserve battery power according to some embodiments. Instead, in certain embodiments, the application is configured to transmit the trip log to the computing device every predetermined time interval. For example, the application transmits the trip data every 12 or 24 hours. In some embodiments, the application transmits the trip log to the computing device at a predetermined time (e.g., at 11 PM) or at a predetermined time duration (e.g., between 11 PM-1 AM). In certain embodiments, the application transmits the trip log to the computing device when one or more predefined conditions are satisfied. For example, the application transmits the trip log between 8 PM-1 AM if the mobile device is connected to a Wi-Fi network and/or a battery charger.

In the illustrative embodiment, if the computing device determines that the distance between the first and second locations exceeds the predetermined threshold and the trip log has not been received from the application of the mobile device, the computing device determines that the mobile device is not functioning properly between the first time and the second time. For example, the mobile device may have been turned off between the first and the second time.

FIGS. 2A and 2B are simplified diagrams showing a method 200 for determining a status of a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 200 is performed by a computing device (e.g., a server 406 that is communicatively coupled to the mobile device). However, it should be appreciated that, in some embodiments, some of the method 200 is performed by the mobile device.

The method 200 includes process 202 for receiving a first set of sensor data at a first time from an application installed on a mobile device of a user, process 204 for determining a first location of the mobile device based at least in part upon the first set of sensor data, process 206 for receiving a second set of sensor data at a second time from the application, process 208 for determining a second location of the mobile device based at least in part upon the second set of sensor data, process 210 for determining a distance between the first location and the second location, process 212 for determining whether the distance corresponding to the time interval exceeds a predetermined threshold, process 214 for determining whether a trip log indicative of at least one trip during the time interval is received from the application, and process 216 for transmitting a notification to the user that the mobile device does not work properly for the application in response to (i) the distance exceeding the predetermined threshold and (ii) the trip log being not received from the application. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 200 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 202, the application that is installed on the mobile device is configured to transmit the first set of sensor data that was collected and/or generated by one or more sensors of the mobile device according to some embodiments. For example, the application broadcasts the first set of sensor data to be received by nearby devices and/or directly transmits the first set of sensor data to a destination computing device (e.g., a server that is communicatively coupled to the mobile device). In response, the computing device receives the first set of sensor data at the first time. According to certain embodiments, the first set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the first set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements.

According to some embodiments, the application is configured to transmit the first set of sensor data periodically every first predetermined time interval when the application is triggered by a predetermined event. For example, in other words, the application works properly in the background and does not transmit any sensor data until the predetermined event occurs. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

According to some embodiments, the computing device determines that the application has been installed on the mobile device of the user if the computing device receives or detects the first set of sensor data that is transmitted by the application. However, in some other embodiments, the computing device determines that the application has been installed on the mobile device by monitoring a download of the application on the mobile device and/or a usage of the application by the user of the mobile device (e.g., account login activities).

At the process 204, the first location of the mobile device is determined based at least in part upon the first set of sensor data received from the mobile device. In the illustrative embodiment, the first location corresponds to the first time. For example, the first location of the mobile device corresponds to the location at which the mobile device was located at the time of the first set of sensor data was received. However, in some embodiments, the first location of the mobile device corresponds to the location at which the mobile device was located at the time of the first set of sensor data was generated or collected by the mobile device.

At the process 206, the application that is installed on the mobile device is configured to transmit the second set of sensor data that was collected and/or generated by one or more sensors of the mobile device according to some embodiments. For example, the application broadcasts the second set of sensor data to be received by nearby devices and/or directly transmits the second set of sensor data to a destination computing device (e.g., a server that is communicatively coupled to the mobile device). In response, the computing device receives the second set of sensor data at the second time. In the illustrative embodiment, the second set of sensor data is a set of sensor data that is received from the mobile device by the computing device immediately subsequent to receiving the first set of sensor data. In other words, the second time follows the first time by a time interval, such that the second set of sensor data is the next sensor data that is being transmitted subsequent to the transmission of the first set of sensor data. However, it should be appreciated that, in some embodiments, the computing device may receive data from the mobile device. It should be appreciated that, in certain embodiments, the second set of sensor data includes sensor data that has been collected or generated from the same sensors of the mobile device that generated the first set of sensor data.

According to certain embodiments, the second set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the second set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the second set of sensor data is collected continuously or at predetermined time intervals. According to certain embodiments, the second set of sensor data is collected based on a triggering event. For example, the second set of sensor data is collected when each sensor has acquired a threshold amount of sensor measurements.

According to some embodiments, the application is configured to transmit the second set of sensor data periodically every second predetermined time interval when the application is triggered by a predetermined event. For example, in other words, the application works properly in the background and does not transmit any sensor data until the predetermined event occurs. It should be appreciated that, in some embodiments, the second predetermined time interval is the same as the first predetermined time interval. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

At the process 208, the second location of the mobile device is determined based at least in part upon the second set of sensor data received from the mobile device. In the illustrative embodiment, the second location corresponds to the second time. For example, the second location of the mobile device corresponds to the location at which the mobile device was located at the time of the second set of sensor data was received. However, in some embodiments, the second location of the mobile device corresponds to the location at which the mobile device was located at the time of the second set of sensor data was generated or collected by the mobile device.

At the process 210, the distance between the first location and the second location is determined. In the illustrative embodiment, the distance corresponds to the time interval from the first time to the second time. In other words, the computing device determines the distance that the mobile device has travelled between the first location at the first time and the second location at the second time. It should be appreciated that no sensor data has been received from the application of the mobile device between the first time and the second time.

At the process 212, the computing device determines whether the distance corresponding to the time interval exceeds the predetermined threshold. According to some embodiments, the predetermined threshold indicates a distance that is expected or estimated based upon a time duration between the first time and the second time. According to certain embodiments, the predetermined threshold is tailored to the user of the mobile device. For example, the predetermined threshold is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data. For example, if the user typically drives 20 miles to and from work between 8 AM-9 AM and 5 PM-6 PM, 5 days (Mondays to Fridays) a week, the predetermined threshold between those time slots is set to 25 miles.

According to some embodiments, the predetermined threshold is determined using one or more machine learning algorithms, programs, modules, or models based upon the historical sensor data and/or information received from the user. According to certain embodiments, the predetermined threshold is defined and provided by the insurer.

In the illustrative embodiment, the computing device determines that the first and second sensor data is unreliable if the distance between the first and second locations exceeds the predetermined threshold. For example, in some embodiments, the distance exceeding the predetermined threshold indicates that the mobile device was turned off between the first time and the second time. In certain embodiments, the distance exceeding the predetermined threshold indicates that the application of the mobile device was inactivated or not working properly between the first and the second time.

At the process 214, if the computing device determines that the distance between the first and second locations exceeds the predetermined threshold, the computing device determines that the mobile device is not functioning properly between the first time and the second time according to some embodiments. For example, if the mobile device was not functioning properly, then the sensor data may not be accurate or reliable. To confirm the reliability of the first and the second data, the computing device determines whether the trip log is received from the application of the mobile device. The trip log indicates at least one trip during the time interval.

According to some embodiments, the application of the mobile device collects and logs trip data based upon a triggering event. For example, the application detects the triggering event when one or more sensors of the mobile device acquires a respective threshold amount of sensor measurements associated with the triggering event. In some embodiments, if the triggering event is a driving event, the application is configured to detect whether the mobile device is located in a moving vehicle based at least upon the sensor measurements. For example, if the mobile device is detected to be located in the moving vehicle, the application determines that a trip has started and collects trip data associated with the trip. In such example, the trip is logged, and the trip data is stored on the mobile device. For example, the trip log is logged in an internal memory 418 of the mobile device 402 as shown in FIG. 4.

In some embodiments, the trip log includes detailed sensor data from one or more sensors of the mobile device indicative of driving behavior. In certain embodiments, the mobile device communicates with the vehicle to obtain vehicle operation data. In such embodiments, the trip log further includes vehicle operation data received from the vehicle.

As discussed above, according to some embodiments, the sensor data is not continuously collected or generated by the one or more sensors of the mobile device. Even if the sensor data is continuously generated, the trip log is not transmitted continuously throughout the day as the sensor data is being generated to preserve battery power according to some embodiments. Instead, in certain embodiments, the application is configured to transmit the trip log to the computing device every predetermined time interval. For example, the application transmits the trip data every 12 or 24 hours. In some embodiments, the application transmits the trip log to the computing device at a predetermined time (e.g., at 11 PM) or at a predetermined time duration (e.g., between 11 PM-1 AM). In certain embodiments, the application transmits the trip log to the computing device when one or more predefined conditions are satisfied. For example, the application transmits the trip log between 8 PM-1 AM if the mobile device is connected to a Wi-Fi network and/or a battery charger.

In the illustrative embodiment, if the computing device determines that the distance between the first and second locations exceeds the predetermined threshold and the trip log has not been received from the application of the mobile device, the computing device determines that the mobile device is not functioning properly between the first time and the second time. For example, the mobile device may have been turned off between the first and the second time.

At the process 216, in response to determining that the distance exceeds the predetermined threshold and that the trip log has not been received from the application, the computing device transmits a notification to the user that the mobile device is not working properly for the application. For example, the notification notifies the user that the mobile device was not working properly between the first time and the second time and asks the user to verify that the mobile device is working properly and is communicating with the application. According to some embodiments, the notification includes instructions how to troubleshoot the application. As an example, the instructions further include contact information (e.g., a phone number and/or an email address) for technical support. According to certain embodiments, the notification includes a message from the insurer that the amount of insurance discount may be updated or adjusted if the mobile device is not working properly for the application to provide the sensor data.

According to some embodiments, receiving the first set of sensor data from the application installed on the mobile device of the user in the process 102 as shown in FIG. 1 is performed by the process 202 as shown in FIG. 2A. According to certain embodiments, determining the first location in the process 104 as shown in FIG. 1 is performed by the process 204 as shown in FIG. 2A. According to some embodiments, receiving the second set of sensor data in the process 106 as shown in FIG. 1 is performed by the process 206 as shown in FIG. 2A. According to certain embodiments, determining the second location in the process 108 as shown in FIG. 1 is performed by the process 208 as shown in FIG. 2A. According to some embodiments, determining the distance between the first location and the second location in the process 110 as shown in FIG. 1 is performed by the process 210 as shown in FIG. 2B. According to certain embodiments, determining whether the distance exceeds the predetermined threshold in the process 112 as shown in FIG. 1 is performed by the process 212 as shown in FIG. 2B. According to certain embodiments, determining whether the trip log was received from the application in the process 114 as shown in FIG. 1 is performed by the process 214 as shown in FIG. 2B.

FIGS. 3A and 3B are simplified diagrams showing a method 300 for determining a status of a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the method 300 is performed by a computing device (e.g., a server 406 that is communicatively coupled to the mobile device). However, it should be appreciated that, in some embodiments, some of the method 300 is performed by the mobile device.

The method 300 includes process 302 for receiving a first set of sensor data at a first time from an application installed on a mobile device of a user, process 304 for determining a first location of the mobile device based at least in part upon the first set of sensor data, process 306 for receiving a second set of sensor data at a second time from the application, process 308 for determining a second location of the mobile device based at least in part upon the second set of sensor data, process 310 for determining a distance between the first location and the second location, process 312 for determining whether the distance corresponding to the time interval exceeds a predetermined threshold, process 314 for determining whether a trip log indicative of at least one trip during the time interval is received from the application, process 316 for transmitting a notification to the user that the mobile device does not work properly for the application in response to (i) the distance exceeding the predetermined threshold and (ii) the trip log being not received from the application, process 318 for updating or adjusting an amount of insurance discount in response to (i) the distance exceeding the predetermined threshold and (ii) the trip being not recorded between the first time and the second time, and process 320 for transmitting a notification to the user of the mobile device indicating that the amount of insurance discount has been updated or adjusted. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. For example, although the method 300 is described as performed by the computing device above, some or all processes of the method are performed by any computing device or a processor directed by instructions stored in memory. As an example, some or all processes of the method are performed according to instructions stored in a non-transitory computer-readable medium.

Specifically, at the process 302, the application that is installed on the mobile device is configured to transmit the first set of sensor data that was collected and/or generated by one or more sensors of the mobile device according to some embodiments. For example, the application broadcasts the first set of sensor data to be received by nearby devices and/or directly transmits the first set of sensor data to a destination computing device (e.g., a server that is communicatively coupled to the mobile device). In response, the computing device receives the first set of sensor data at the first time. According to certain embodiments, the first set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the first set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the first set of sensor data is collected continuously or at predetermined time intervals. According to certain embodiments, the first set of sensor data is collected based on a triggering event. For example, the first set of sensor data is collected when each sensor has acquired a threshold amount of sensor measurements.

According to some embodiments, the application is configured to transmit the first set of sensor data periodically every first predetermined time interval when the application is triggered by a predetermined event. For example, in other words, the application works properly in the background and does not transmit any sensor data until the predetermined event occurs. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

According to some embodiments, the computing device determines that the application has been installed on the mobile device of the user if the computing device receives or detects the first set of sensor data that is transmitted by the application. However, in some other embodiments, the computing device determines that the application has been installed on the mobile device by monitoring a download of the application on the mobile device and/or a usage of the application by the user of the mobile device (e.g., account login activities).

At the process 304, the first location of the mobile device is determined based at least in part upon the first set of sensor data received from the mobile device. In the illustrative embodiment, the first location corresponds to the first time. For example, the first location of the mobile device corresponds to the location at which the mobile device was located at the time of the first set of sensor data was received. However, in some embodiments, the first location of the mobile device corresponds to the location at which the mobile device was located at the time of the first set of sensor data was generated or collected by the mobile device.

At the process 306, the application that is installed on the mobile device is configured to transmit the second set of sensor data that was collected and/or generated by one or more sensors of the mobile device according to some embodiments. For example, the application broadcasts the second set of sensor data to be received by nearby devices and/or directly transmits the second set of sensor data to a destination computing device (e.g., a server that is communicatively coupled to the mobile device). In response, the computing device receives the second set of sensor data at the second time. In the illustrative embodiment, the second set of sensor data is a set of sensor data that is received from the mobile device by the computing device immediately subsequent to receiving the first set of sensor data. In other words, the second time follows the first time by a time interval, such that the second set of sensor data is the next sensor data that is being transmitted subsequent to the transmission of the first set of sensor data. However, it should be appreciated that, in some embodiments, the computing device may receive data from the mobile device. It should be appreciated that, in certain embodiments, the second set of sensor data includes sensor data that has been collected or generated from the same sensors of the mobile device that generated the first set of sensor data.

According to certain embodiments, the second set of sensor data includes information related to a user activity (e.g., driving behavior). As an example, the user driving behavior represents a manner in which the user has operated a vehicle. For example, the user driving behavior indicates the user's driving habits and/or driving patterns.

According to some embodiments, the second set of sensor data indicative of the user driving behavior is collected from one or more sensors associated with the user's mobile device. For example, the one or more sensors include any type and number of accelerometers, gyroscopes, magnetometers, location sensors (e.g., GPS sensors), and/or any other suitable sensors that measure the state and/or movement of the mobile device. In certain embodiments, the second set of sensor data is collected continuously or at predetermined time intervals. According to certain embodiments, the second set of sensor data is collected based on a triggering event. For example, the second set of sensor data is collected when each sensor has acquired a threshold amount of sensor measurements.

According to some embodiments, the application is configured to transmit the second set of sensor data periodically every second predetermined time interval when the application is triggered by a predetermined event. For example, in other words, the application works properly in the background and does not transmit any sensor data until the predetermined event occurs. It should be appreciated that, in some embodiments, the second predetermined time interval is the same as the first predetermined time interval. As an example, this reduces a battery power consumption and preserves battery life. For example, the predetermined event is a driving event. According to certain embodiments, the application determines the driving event based on the sensor data collected or generated by the mobile device. Additionally or alternatively, the application receives an input from the user that indicates that the user is driving according to certain embodiments.

At the process 308, the second location of the mobile device is determined based at least in part upon the second set of sensor data received from the mobile device. In the illustrative embodiment, the second location corresponds to the second time. For example, the second location of the mobile device corresponds to the location at which the mobile device was located at the time of the second set of sensor data was received. However, in some embodiments, the second location of the mobile device corresponds to the location at which the mobile device was located at the time of the second set of sensor data was generated or collected by the mobile device.

At the process 310, the distance between the first location and the second location is determined. In the illustrative embodiment, the distance corresponds to the time interval from the first time to the second time. In other words, the computing device determines the distance that the mobile device has travelled between the first location at the first time and the second location at the second time. It should be appreciated that no sensor data has been received from the application of the mobile device between the first time and the second time.

At the process 312, the computing device determines whether the distance corresponding to the time interval exceeds the predetermined threshold. According to some embodiments, the predetermined threshold indicates a distance that is expected or estimated based upon a time duration between the first time and the second time. According to certain embodiments, the predetermined threshold is tailored to the user of the mobile device. For example, the predetermined threshold is based upon a life routine or pattern of the user (e.g., a driving pattern) at a particular time of a day, a particular time of a week, a particular time of a month, a particular time of a year, or any combination thereof. In some embodiments, these user data are obtained directly from the user or determined and/or predicted based on the previous sensor data. For example, if the user typically drives 20 miles to and from work between 8 AM-9 AM and 5 PM-6 PM, 5 days (Mondays to Fridays) a week, the predetermined threshold between those time slots is set to 25 miles.

According to some embodiments, the predetermined threshold is determined using one or more machine learning algorithms, programs, modules, or models based upon the historical sensor data and/or information received from the user. According to certain embodiments, the predetermined threshold is defined and provided by the insurer.

In the illustrative embodiment, the computing device determines that the first and second sensor data is unreliable if the distance between the first and second locations exceeds the predetermined threshold. For example, in some embodiments, the distance exceeding the predetermined threshold indicates that the mobile device was turned off between the first time and the second time. In certain embodiments, the distance exceeding the predetermined threshold indicates that the application of the mobile device was inactivated or not working properly between the first and the second time.

At the process 314, if the computing device determines that the distance between the first and second locations exceeds the predetermined threshold, the computing device determines that the mobile device is not functioning properly between the first time and the second time according to some embodiments. For example, if the mobile device was not functioning properly, then the sensor data may not be accurate or reliable. To confirm the reliability of the first and the second data, the computing device determines whether the trip log is received from the application of the mobile device. The trip log indicates at least one trip during the time interval.

According to some embodiments, the application of the mobile device collects and logs trip data based upon a triggering event. For example, the application detects the triggering event when one or more sensors of the mobile device acquires a respective threshold amount of sensor measurements associated with the triggering event. In some embodiments, if the triggering event is a driving event, the application is configured to detect whether the mobile device is located in a moving vehicle based at least upon the sensor measurements. For example, if the mobile device is detected to be located in the moving vehicle, the application determines that a trip has started and collects trip data associated with the trip. In such example, the trip is logged, and the trip data is stored on the mobile device. For example, the trip log is logged in an internal memory 418 of the mobile device 402 as shown in FIG. 4.

In some embodiments, the trip log includes detailed sensor data from one or more sensors of the mobile device indicative of driving behavior. In certain embodiments, the mobile device communicates with the vehicle to obtain vehicle operation data. In such embodiments, the trip log further includes vehicle operation data received from the vehicle.

As discussed above, according to some embodiments, the sensor data is not continuously collected or generated by the one or more sensors of the mobile device. Even if the sensor data is continuously generated, the trip log is not transmitted continuously throughout the day as the sensor data is being generated to preserve battery power according to some embodiments. Instead, in certain embodiments, the application is configured to transmit the trip log to the computing device every predetermined time interval. For example, the application transmits the trip data every 12 or 24 hours. In some embodiments, the application transmits the trip log to the computing device at a predetermined time (e.g., at 11 PM) or at a predetermined time duration (e.g., between 11 PM-1 AM). In certain embodiments, the application transmits the trip log to the computing device when one or more predefined conditions are satisfied. For example, the application transmits the trip log between 8 PM-1 AM if the mobile device is connected to a Wi-Fi network and/or a battery charger.

In the illustrative embodiment, if the computing device determines that the distance between the first and second locations exceeds the predetermined threshold and the trip log has not been received from the application of the mobile device, the computing device determines that the mobile device is not functioning properly between the first time and the second time. For example, the mobile device may have been turned off between the first and the second time.

At the process 316, in response to determining that the distance exceeds the predetermined threshold and that the trip log has not been received from the application, the computing device transmits a notification to the user that the mobile device is not working properly for the application. For example, the notification notifies the user that the mobile device was not working properly between the first time and the second time and asks the user to verify that the mobile device is working properly and is communicating with the application. According to some embodiments, the notification includes instructions how to troubleshoot the application. As an example, the instructions further include contact information (e.g., a phone number and/or an email address) for technical support. According to certain embodiments, the notification includes a message from the insurer that the amount of insurance discount may be updated or adjusted if the mobile device is not working properly for the application to provide the sensor data.

At the process 318, the computing device is configured to update or adjust the amount of insurance discount in response to determining that the distance between the first and second locations exceeds the threshold and the trip has not been recorded between the first and second times according to some embodiments. According to certain embodiments, the user receives an initial discount from an insurer for installing the application and authorizing the application to transmit the set of sensor data collected and/or generated by one or more sensors of the mobile device. For example, as discussed above, the sensor data includes information related to a user activity, such as driving behavior. As an example, the sensor data provided by the application related to the driving behavior of the user is used to generate alert notifications to the user that may reduce the likelihood of a collision or other damage occurring to the vehicle or the user. In other words, because the use of the application functions to mitigate or prevent driving risks upon which an insurance policy is partially based, the insurer provides an additional discount to the user for installing and continuing to use the application according to some embodiments. As such, for example, in response to determining that the application is not working properly to provide the sensor data, the insurance discounts, premiums, rates, points, or programs is calculated, updated, and/or adjusted. In certain embodiments, the updated or adjusted insurance discount, premiums, rates, points, or programs is communicated to the user for the user's review, modification, and/or approval.

At the process 320, the computing device transmits the notification to the user of the mobile device indicating that the amount of insurance discount has been updated or adjusted according to some embodiments. For example, the notification further includes one or more corrective actions that the user may take in order to qualify for one or more insurance discounts.

According to some embodiments, receiving the first set of sensor data from the application installed on the mobile device of the user in the process 102 as shown in FIG. 1 and/or in the process 202 as shown in FIG. 2A is performed by the process 302 as shown in FIG. 3A. According to certain embodiments, determining the first location in the process 104 as shown in FIG. 1 and/or in process 204 as shown in FIG. 2A is performed by the process 304 as shown in FIG. 3A. According to some embodiments, receiving the second set of sensor data in the process 106 as shown in FIG. 1 and/or in process 206 as shown in FIG. 2A is performed by the process 306 as shown in FIG. 3A. According to certain embodiments, determining the second location in the process 108 as shown in FIG. 1 and/or in process 208 as shown in FIG. 2A is performed by the process 308 as shown in FIG. 3A. According to some embodiments, determining the distance between the first location and the second location in the process 110 as shown in FIG. 1 and/or in process 210 as shown in FIG. 2B is performed by the process 310 as shown in FIG. 3B. According to certain embodiments, determining whether the distance exceeds the predetermined threshold in the process 112 as shown in FIG. 1 and/or in process 212 as shown in FIG. 2B is performed by the process 312 as shown in FIG. 3B. According to certain embodiments, determining whether the trip log was received from the application in the process 114 as shown in FIG. 1 and/or in process 214 as shown in FIG. 2B is performed by the process 314 as shown in FIG. 3B.

II. ONE OR MORE SYSTEMS FOR DETERMINING A STATUS OF A MOBILE DEVICE ACCORDING TO CERTAIN EMBODIMENTS

FIG. 4 is a simplified diagram showing a system for determining a status of a mobile device of a user according to certain embodiments of the present disclosure. This diagram is merely an example, which should not unduly limit the scope of the claims. One of ordinary skill in the art would recognize many variations, alternatives, and modifications. In the illustrative embodiment, the system 400 includes a mobile device 402, a network 404, and a server 406. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced.

In various embodiments, the system 400 is used to implement the method 100, the method 200, and/or the method 300. According to certain embodiments, the mobile device 402 is communicatively coupled to the server 406 via the network 404. As an example, the mobile device 402 includes one or more processors 416 (e.g., a central processing unit (CPU), a graphics processing unit (GPU)), a memory 418 (e.g., random-access memory (RAM), read-only memory (ROM), flash memory), a communications unit 420 (e.g., a network transceiver), a display unit 422 (e.g., a touchscreen), and one or more sensors 424 (e.g., an accelerometer, a gyroscope, a magnetometer, a location sensor). For example, the one or more sensors 424 are configured to generate sensor data. According to some embodiments, the data are collected continuously, at predetermined time intervals, and/or based on a triggering event (e.g., when each sensor has acquired a threshold amount of sensor measurements).

In some embodiments, the mobile device 402 is operated by the user. For example, the user installs an application associated with an insurer on the mobile device 402 and allows the application to communicate with the one or more sensors 424 to collect sensor data. According to some embodiments, the application collects the sensor data continuously, at predetermined time intervals, and/or based on a triggering event (e.g., when each sensor has acquired a threshold amount of sensor measurements). In certain embodiments, the sensor data represents the user's activity/ behavior, such as the user driving behavior, in the method 100, the method 200, and/or the method 300.

According to certain embodiments, the collected data are stored in the memory 418 before being transmitted to the server 406 using the communications unit 422 via the network 404 (e.g., via a local area network (LAN), a wide area network (WAN), the Internet). In some embodiments, the collected data are transmitted directly to the server 406 via the network 404. In certain embodiments, the collected data are transmitted to the server 406 via a third party. For example, a data monitoring system stores any and all data collected by the one or more sensors 424 and transmits those data to the server 406 via the network 404 or a different network.

According to certain embodiments, the server 406 includes a processor 430 (e.g., a microprocessor, a micro-controller), a memory 432, a communications unit 434 (e.g., a network transceiver), and a data storage 436 (e.g., one or more databases). In some embodiments, the server 406 is a single server, while in certain embodiments, the server 406 includes a plurality of servers with distributed processing. As an example, in FIG. 4, the data storage 436 is shown to be part of the server 406. In some embodiments, the data storage 436 is a separate entity coupled to the server 406 via a network such as the network 404. In certain embodiments, the server 406 includes various software applications stored in the memory 432 and executable by the processor 430. For example, these software applications include specific pro-grams, routines, or scripts for performing functions associ-ated with the method 100, the method 200, and/or the method 300. As an example, the software applications include general-purpose software applications for data pro-cessing, network communication, database management, web server operation, and/or other functions typically per-formed by a server.

According to various embodiments, the server 406 receives, via the network 404, the sensor data collected by the one or more sensors 424 from the application using the communications unit 434 and stores the data in the data storage 436. For example, the server 406 then processes the data to perform one or more processes of the method 100, one or more processes of the method 200, and/or one or more processes of the method 300.

According to certain embodiments, the notification in response to the application being determined not working properly in the method 100, the method 200, and/or the method 300 is transmitted back to the mobile device 402, via the network 404, to be provided (e.g., displayed) to the user via the display unit 422.

In some embodiments, one or more processes of the method 100, one or more processes of the method 200, and/or one or more processes of the method 300 are per-formed by the mobile device 402. For example, the proces-sor 416 of the mobile device 402 processes the data collected by the one or more sensors 424 to perform one or more processes of the method 100, one or more processes of the method 200, and/or one or more processes of the method 300.

III. EXAMPLES OF CERTAIN EMBODIMENTS OF THE PRESENT DISCLOSURE

According to some embodiments, a method for determin-ing a status of a mobile device of a user includes receiving first sensor data at a first time from an application installed on a mobile device of a user and determining a first location of the mobile device based at least in part upon the first sensor data. The first location corresponds to the first time. The method further includes immediately subsequent to receiving the first sensor data at the first time, receiving second sensor data at a second time from the application and determining a second location of the mobile device based at least in part upon the second sensor data. The second time follows the first time by a time interval, and the second location corresponds to the second time. Additionally, the method includes determining a distance between the first location and the second location. The distance corresponds to the time interval from the first time to the second time. Moreover, the method includes determining whether the distance corresponding to the time interval exceeds a pre-determined threshold and determining whether a trip log indicative of at least one trip during the time interval is received from the application. For example, the method is implemented according to at least FIG. 1, FIGS. 2A and 2B, and/or FIGS. 3A and 3B.

According to certain embodiments, a computing device for determining a status of a mobile device of a user includes one or more processors and a memory that stores instruc-tions for execution by the one or more processors. The instructions, when executed, cause the one or more proces-sors to receive first sensor data at a first time from an application installed on a mobile device of a user and determine a first location of the mobile device based at least in part upon the first sensor data. The first location corre-sponds to the first time. Also, the instructions, when executed, cause the one or more processors to immediately subsequent to receiving the first sensor data at the first time, receive second sensor data at a second time from the application and determine a second location of the mobile device based at least in part upon the second sensor data. The second time follows the first time by a time interval, and the second location corresponds to the second time. Addition-ally, the instructions, when executed, cause the one or more processors to determine a distance between the first location and the second location. The distance corresponds to the time interval from the first time to the second time. More-over, the instructions, when executed, cause the one or more processors to determine whether the distance corresponding to the time interval exceeds a predetermined threshold and determine whether a trip log indicative of at least one trip during the time interval is received from the application. For example, the computing device is implemented according to at least FIG. 4.

According to some embodiments, a non-transitory com-puter-readable medium stores instructions for determining a status of a mobile device of a user. The instructions are executed by one or more processors of a computing device. The non-transitory computer-readable medium includes instructions to receive first sensor data at a first time from an application installed on a mobile device of a user and determine a first location of the mobile device based at least in part upon the first sensor data. The first location corre-sponds to the first time. Also, the non-transitory computer-readable medium includes instructions to immediately sub-sequent to receiving the first sensor data at the first time, receive second sensor data at a second time from the application and determine a second location of the mobile device based at least in part upon the second sensor data. The second time follows the first time by a time interval, and the second location corresponds to the second time. Addition-ally, the non-transitory computer-readable medium includes instructions to determine a distance between the first location and the second location. The distance corresponds to the time interval from the first time to the second time. Moreover, the non-transitory computer-readable medium includes instructions to determine whether the distance corresponding to the time interval exceeds a predetermined threshold and determine whether a trip log indicative of at least one trip during the time interval is received from the application. For example, the non-transitory computer-readable medium is implemented according to at least FIG. 1, FIGS. 2A and 2B, FIGS. 3A and 3B, and/or FIG. 4.

IV. EXAMPLES OF MACHINE LEARNING ACCORDING TO CERTAIN EMBODIMENTS

According to some embodiments, a processor or a processing element may be trained using supervised machine learning and/or unsupervised machine learning, and the machine learning may employ an artificial neural network, which, for example, may be a convolutional neural network, a recurrent neural network, a deep learning neural network, a reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

According to certain embodiments, machine learning programs may be trained by inputting sample data sets or certain data into the programs, such as images, object statistics and information, historical estimates, and/or actual repair costs. The machine learning programs may utilize deep learning algorithms that may be primarily focused on pattern recognition and may be trained after processing multiple examples. The machine learning programs may include Bayesian Program Learning (BPL), voice recognition and synthesis, image or object recognition, optical character recognition, and/or natural language processing. The machine learning programs may also include natural language processing, semantic analysis, automatic reasoning, and/or other types of machine learning.

According to some embodiments, supervised machine learning techniques and/or unsupervised machine learning techniques may be used. In supervised machine learning, a processing element may be provided with example inputs and their associated outputs and may seek to discover a general rule that maps inputs to outputs, so that when subsequent novel inputs are provided the processing element may, based upon the discovered rule, accurately predict the correct output. In unsupervised machine learning, the processing element may need to find its own structure in unlabeled example inputs.

V. ADDITIONAL CONSIDERATIONS ACCORDING TO CERTAIN EMBODIMENTS

For example, some or all components of various embodiments of the present disclosure each are, individually and/or in combination with at least another component, implemented using one or more software components, one or more hardware components, and/or one or more combinations of software and hardware components. As an example, some or all components of various embodiments of the present disclosure each are, individually and/or in combination with at least another component, implemented in one or more circuits, such as one or more analog circuits and/or one or more digital circuits. For example, while the embodiments described above refer to particular features, the scope of the present disclosure also includes embodiments having different combinations of features and embodiments that do not include all of the described features. As an example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Certain implementations may also be used, however, such as firmware or even appropriately designed hardware configured to perform the methods and systems described herein.

The systems' and methods' data (e.g., associations, mappings, data input, data output, intermediate data results, final data results) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include mobile devices and servers. A mobile device and server are generally remote from each other and typically interact through a communication network. The relationship of mobile device and server arises by virtue of computer programs running on the respective computers and having a mobile device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed is:

1. A computer-implemented method for evaluating reliability of data, comprising:

using a first set of sensor data from one or more sensors, transmitted at a first time, to determine, by at least one processor of a mobile device, a first location of the mobile device at the first time;

using a second set of sensor data from the one or more sensors, transmitted at a second, later time, to determine, by the at least one processor, a second location of the mobile device at a second time;

determining, by the at least one processor, whether a distance between the first location and the second location exceeds a threshold;

determining, by the at least one processor, whether a trip log indicative of at least one trip during a time interval from the first time to the second time was transmitted; and in response to the distance exceeding the threshold and the trip log not being transmitted, causing a first notification to be displayed to a user indicating that at least one of the first set of sensor data or the second set of sensor data is unreliable.

2. The computer-implemented method of claim 1, wherein the distance between the first location and the second location corresponds to the time interval from the first time to the second time.

3. The computer-implemented method of claim 1, wherein the trip log is generated in response to detection of the mobile device in a moving vehicle.

4. The computer-implemented method of claim 3, wherein an application installed on the mobile device is configured to transmit the trip log when one or more predefined conditions are satisfied.

5. The computer-implemented method of claim 3, wherein each of the first set of sensor data and the second set of sensor data includes at least one of accelerometer data, GPS data, gyroscope data or magnetometer data.

6. The computer-implemented method of claim 1, wherein the threshold is an expected distance based upon a time duration between the first time and the second time.

7. The computer-implemented method of claim 6, wherein the expected distance is based upon a driving pattern of the user.

8. The computer-implemented method of claim 1, further comprising:

in response to the distance exceeding the threshold and the trip log not being transmitted, adjusting an amount of an insurance discount; and causing a second notification to be displayed to the user indicating that the amount of the insurance discount has been adjusted.

9. The computer-implemented method of claim 8, wherein the second notification includes at least one of (a) a request that the user verify that the mobile device is working properly, (b) instructions for contacting technical support or (c) a corrective action that the user may take to qualify for one or more insurance discounts.

10. A mobile device for evaluating reliability of data, comprising:

a processor; and a memory having a plurality of instructions stored thereon that, when executed by the processor, causes the processor to:

determine, using a first set of sensor data from one or more sensors transmitted at a first time, a first location of the mobile device at the first time;

determine, using a second set of sensor data from the one or more sensors transmitted at a second, later time, a second location of the mobile device at a second time;

determine whether a distance between the first location and the second location exceeds a threshold;

determine whether a trip log indicative of at least one trip during a time interval from the first time to the second time was transmitted; and in response to the distance exceeding the threshold and the trip log not being transmitted, cause a first notification to be displayed to a user indicating that at least one of the first set of sensor data or the second set of sensor data is unreliable.

11. The mobile device of claim 10, wherein the distance between the first location and the second location corresponds to the time interval from the first time to the second time.

12. The mobile device of claim 10, wherein the trip log is generated in response to detection of the mobile device in a moving vehicle.

13. The mobile device of claim 12, wherein an application installed on the mobile device is configured to transmit the trip log when one or more predefined conditions are satisfied.

14. The mobile device of claim 12, wherein each of the first set of sensor data and the second set of sensor data includes at least one of accelerometer data, GPS data, gyroscope data or magnetometer data.

15. The mobile device of claim 14, wherein the threshold is an expected distance based upon a time duration between the first time and the second time.

16. The mobile device of claim 15, wherein the expected distance is based upon a driving pattern of the user.

17. The mobile device of claim 10, wherein the plurality of instructions, when executed by the processor, further cause the processor to:

adjust an amount of an insurance discount in response to the distance exceeding the threshold and the trip log not being transmitted; and cause a second notification to be displayed to the user indicating that the amount of the insurance discount has been adjusted.

18. The mobile device of claim 17, wherein the second notification includes at least one of (a) a request that the user verify that the mobile device is working properly, (b) instructions for contacting technical support or (c) a corrective action that the user may take to qualify for one or more insurance discounts.

19. A system for evaluating reliability of data, comprising:

means for determining, using a first set of sensor data from the one or more sensors, transmitted at a first time, a first location of a mobile device at the first time;

means for determining, using a second set of sensor data from one or more sensors, transmitted at a second, later time, a second location of the mobile device at a second time;

means for determining whether a distance between the first location and the second location exceeds a threshold;

means for determining whether a trip log indicative of at least one trip during a time interval from the first time to the second time was transmitted; and means for causing, in response to the distance exceeding the threshold and the trip log not being transmitted, a first notification to be displayed to a user indicating that at least one of the first set of sensor data or the second set of sensor data is unreliable.

20. The system of claim 19, wherein the distance between the first location and the second location corresponds to the time interval from the first time to the second time.

\* \* \* \* \*